Nov. 29, 1927. 1,650,986
E. C. HERTHEL ET AL
LEVEL INDICATOR OR TELLTALE FOR OIL STILLS AND THE LIKE
Filed Nov. 28, 1921
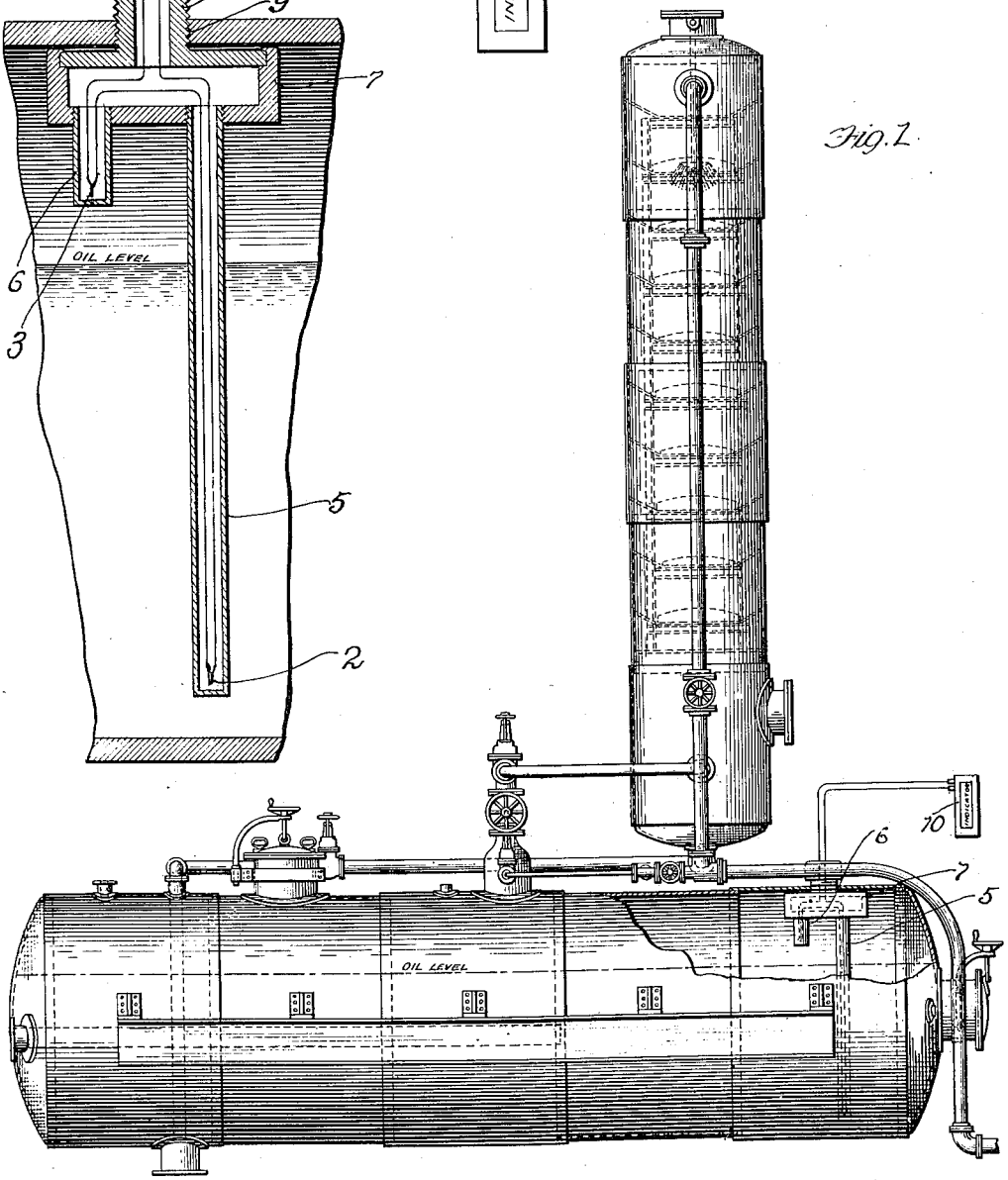

Patented Nov. 29, 1927.

1,650,986

UNITED STATES PATENT OFFICE.

EUGENE C. HERTHEL AND EDWARD W. ISOM, OF CHICAGO, ILLINOIS, ASSIGNORS TO SINCLAIR REFINING COMPANY, OF CHICAGO, ILLINOIS, A CORPORATION OF MAINE.

LEVEL INDICATOR OR TELLTALE FOR OIL STILLS AND THE LIKE.

Application filed November 28, 1921. Serial No. 518,173.

Our invention is particularly designed for and useful in connection with pressure stills, i. e., stills for cracking crude petroleum, gas-oil and hydrocarbons of relatively high boiling point for the production of the more valuable gasoline and other relatively light or low gravity products, and is therefore described and applied to a still of this character. But as will more fully appear from the following specification, it may also be used for a variety of similar purposes.

In the process of cracking hydrocarbons it is essential to proper working that the level of the oil in the retort be kept constantly within certain limits as it is necessary to maintain a certain depth of oil in the still, notwithstanding the constant or irregular supply of raw material, the driving off of vapors, gases and the like, and the drawing off of the tar as formed, and also to preserve an adequate vapor space above the liquid for the volatilization of the lighter components. It is difficult to accurately measure and control the feed of material to the still, the withdrawal of tar and the passing off of the gases and vapors formed largely because of the very high temperature and pressure under which it is necessary to operate to secure the best results. It is therefore desirable to keep the level of the liquid under close observation, but prior to my invention no satisfactory apparatus for this purpose has been devised. Gauge-glasses, which are ordinarily employed for this purpose are liable to crack or be destroyed with disastrous results since the still contains a large body of oil under high pressure and at a temperature far above its ignition point.

Our invention provides an accurate means for keeping the operator advised of the level of the oil in the still without the danger, difficulty and inconvenience inherent in gauge-glasses and the like. Our improved tell-tale or indicator depends for its operation upon the well-known fact that the temperature of the liquid oil in a cracking still is materially higher, perhaps by 70 to 80 degrees, than the temperature of the vapor immediately above the oil. We take advantage of this known fact by locating in the still at points respectively above and below the level at which it is desired to maintain the liquid, a pair of thermo-couples electrically connected together in such a way as to tend to develop counter or opposed electromotive forces, there being inserted in the circuit a milli-volt meter, galvanometer or other delicate indicator to show the difference in potential or the amount of current developed by the couples. Obviously in normal operation, the couple the hot junction of which is below the level of the oil in the still, being at the higher temperature, develops the higher electromotive force and causes a flow of current notwithstanding the presence of the other couple in the circuit. When, however, the level of oil rises so that it also submerges the upper thermo-couple, the temperature of the latter rises until it equals or substantially equals the temperature of the lower thermo-couple and as the two couples are opposed the current falls to zero.

Our invention can be carried out in a variety of ways but in the accompanying drawings we have illustrated and in the following description specifically set forth the preferred embodiment thereof; it is to be understood, however, that the specific disclosure is for the purpose of exemplification only and that the scope of the invention is defined in the following claims in which we have endeavored to distinguish it from the prior art so far as known to us, without, however, relinquishing or abandoning any portion or feature thereof.

In the accompanying drawing Fig. 1 is a side elevation partly broken away of a still embodying our invention in its preferred form, and Fig. 2 an enlarged detail of the tell-tale.

It is unnecessary for the present purpose to describe the still as the invention is applicable irrespective of the character thereof and reference may be made to Patent No. 1,285,200 granted to the Sinclair Refining Company November 19, 1918, on the application of Edward W. Isom, as showing one form of still in connection with which the invention may be used.

The still proper or tank is indicated at 1 in the drawing. In its broader aspect the invention is independent of the manner of mounting the thermo-couples in the still. In the preferred construction shown in the drawings, the thermo-couples 2, 3 are respectively mounted in a pair of tubes 5, 6 of unequal length the lower ends of which are closed by welding or otherwise and the upper ends open and screwed or otherwise secured in a housing 7 having a hollow neck 8, tapped into an opening 9 in the top of the still. The thermo-couples are alike and may be formed of any suitable metals supplying sufficient electromotive force, the thermo-couples in commercial use being satisfactory for this purpose. The junctions of the thermo-couples 2, 3 are insulated in their respective tubes and are connected in series, one pair of the similar elements of the two couples, either the more electro-positive or the more electro-negative being directly connected together so that the electro-motive forces thereof are opposed. The elements of the other metal are connected to a suitable indicating instrument such as a milli-volt meter or a galvanometer 10. The junctions of the respective couples are so located in their tubes that when the device is in place in the still the lowermost junction is always beneath the level of the oil, preferably some distance below said level. The other junction is located above the normal level of the liquid in the still, preferably but a short distance below the maximum level which can be tolerated.

When the still is in operation, with the tell-tale in place, the lower portion of the tube 5, surrounding the lower junction 2 being immersed in the oil, is considerably hotter than the tube 6 surrounding the other junction 3, the difference in temperature between the liquid oil and the vapors amounting to 70 or 80 degrees Fahrenheit. The electromotive force due to the hotter couple will be greater than that opposed to it by the less highly heated couple which is above the surface of the liquid in the still and consequently a difference of potential will be indicated in the milli-volt meter or current in the galvanometer, according to which of the latter instruments is used as an indicator. This current and difference of potential will be maintained so long as the still is operated at normal temperature of use and the level of the oil remains practically constant. When, however, the oil submerges the tube 6 containing the upper thermo-couple 3, the temperature of the junctions of the respective thermo-couples will be substantially the same and there will be neither difference of potential nor current and the indicating device will show zero or substantially zero.

Obviously, if desired, the lower junction could be so located that the fall of the liquid to a point to uncover the same would also be indicated by a zero reading of the indicator. Furthermore, it is not essential to our invention in its broader aspects that the thermo-couples be mounted in the same tube, though we have found this construction satisfactory for the purpose. By using several differential couples connected in series instead of a single couple the electromotive force and current may be correspondingly increased and less sensitive indicators used.

We claim:

1. A still, a pair of thermo-couples each having its hot junction within the still, the junction of one of the thermo-couples being above the normal level of the liquid in the still and the junction of the other thermo-couple being below the normal liquid level of the still, said thermo-couples being so connected as to oppose each other, and an indicator in circuit with said couples.

2. In combination with a still for the distillation of oil or the like, a pair of thermo-couples each having a junction located within the still, one of the junctions being below and the other above the normal liquid-level, one pair of similar elements of the couples being connected together, and an indicator, the other similar elements of the thermo-couples being connected to the respective terminals of said indicator.

3. In combination with a vessel containing oil and vapors, a tell-tale for indicating the level of the oil therein comprising a pair of thermo-couples at spaced levels within the still having two of their respective like elements connected together, and an indicator connected to the other like elements of the thermo-couples.

4. A level tell-tale for stills, comprising a tube adapted to be partially immersed in the liquid in the still, a pair of thermo-couples each having a junction within the tube, said junctions being spaced apart longitudinally of the tube, one pair of similar elements of the couples being connected together, and an indicator connected to the other pair of similar elements of the two couples.

EUGENE C. HERTHEL.
EDWARD W. ISOM.